(12) United States Patent
Janesh et al.

(10) Patent No.: US 8,393,365 B2
(45) Date of Patent: Mar. 12, 2013

(54) TIRE TREAD HAVING SERRATED GROOVES

(75) Inventors: Joseph Thomas Janesh, Tallmadge, OH (US); Daniel Abe Alford, Wadsworth, OH (US); Kelly Sue King, Wadsworth, OH (US); Brian David Digman, Cuyahoga Falls, OH (US); Richard Mark Wieland, Akron, OH (US); David Michael Howard, Troutman, NC (US)

(73) Assignee: The Goodyear Tire & Rubber Company, Akron, OH (US)

( * ) Notice: Subject to any disclaimer, the term of this patent is extended or adjusted under 35 U.S.C. 154(b) by 587 days.

(21) Appl. No.: 12/636,004

(22) Filed: Dec. 11, 2009

(65) Prior Publication Data

US 2011/0139325 A1 Jun. 16, 2011

(51) Int. Cl.
*B60C 11/13* (2006.01)
(52) U.S. Cl. ......... 152/209.15; 152/209.21; 152/209.28; 152/DIG. 3
(58) Field of Classification Search ............. 152/209.15, 152/209.17, 209.21, 209.28, DIG. 3
See application file for complete search history.

(56) References Cited

U.S. PATENT DOCUMENTS

| | | |
|---|---|---|
| 2,121,955 A | 6/1938 | Eger |
| 3,570,571 A | 3/1971 | Riches ........................... 152/209 |
| 5,316,063 A | 5/1994 | Lagnier ..................... 152/209 R |
| 6,102,092 A | 8/2000 | Radulescu ............... 152/209.19 |
| 6,116,310 A | 9/2000 | Shinohara ................. 152/209.21 |
| 6,123,130 A | 9/2000 | Himuro et al. ............. 152/209.3 |
| 6,408,910 B1 * | 6/2002 | Lagnier et al. ........... 152/DIG. 3 |
| 6,467,517 B1 | 10/2002 | Radulescu .................. 152/209.2 |
| 6,561,242 B2 | 5/2003 | Chaen et al. ............. 152/209.18 |
| 6,601,623 B1 | 8/2003 | Katayama ................. 152/209.15 |
| 6,668,886 B1 | 12/2003 | Iwamura ................. 152/209.18 |
| 6,681,824 B2 | 1/2004 | Lopez ...................... 152/209.21 |
| 6,792,828 B2 | 9/2004 | Ishihara ...................... 76/107.1 |
| 6,907,910 B2 | 6/2005 | Iwamura ................. 152/209.18 |
| 7,017,634 B2 | 3/2006 | Radulescu et al. ....... 152/209.21 |
| 7,143,799 B2 | 12/2006 | Collette et al. ........... 152/209.21 |
| 7,546,861 B2 | 6/2009 | Nguyen et al. ........... 152/209.18 |

(Continued)

FOREIGN PATENT DOCUMENTS

| | | |
|---|---|---|
| EP | 1533141 | 5/2005 |
| EP | 1661732 | 5/2006 |

(Continued)

OTHER PUBLICATIONS

Machine translation for Japan 08-048115 (no. date).*

(Continued)

*Primary Examiner* — Steven D Maki
(74) *Attorney, Agent, or Firm* — Richard B. O'Planick (57) ABSTRACT

A tread is configured to have three rows of tread elements, a center row and a pair of shoulder rows, the center row forming a circumferential rib positioned at an equatorial centerplane of the tread. Each shoulder row has a repeating circumferential array of upwardly extending elongate groove fingers, adjacent groove fingers within the repeating array of each shoulder row of groove fingers being connected by at least one laterally extending channel. An array of serrations line each longitudinal side of the channels, each serration defined by inward tapering serration sidewalls extending to a serration base surface. Each channel is submerged below an outward tread surface such that the submerged channel will emerge as the tread wears down.

12 Claims, 9 Drawing Sheets

U.S. PATENT DOCUMENTS

2004/0256039 A1 * 12/2004 Ratliff et al. ............. 152/DIG. 3
2007/0095447 A1    5/2007 Nguyen et al. ............ 152/209.18
2010/0059156 A1 *  3/2010 Cambron et al. .......... 152/209.5

FOREIGN PATENT DOCUMENTS

| FR | 2763892 | | 12/1998 |
|----|---------|---|---------|
| JP | 05-069706 A | * | 3/1993 |
| JP | 07-186633 A | * | 7/1995 |
| JP | 07-257111 A | * | 10/1995 |
| JP | 08-048115 A | * | 2/1996 |
| JP | 08048115 | | 2/1996 |
| JP | 08332810 | | 12/1996 |
| JP | 2001130227 | | 5/2001 |
| JP | 2003118322 | | 4/2003 |
| JP | 2005104194 | | 4/2005 |
| WO | 9948707 | | 9/1999 |
| WO | 0238399 | | 5/2002 |

OTHER PUBLICATIONS

Machine translation for Japan 05-069706 (no. date).*
Machine translation for Japan 07-257111 (no. date).*
Translation for Japan 07-186633 (no. date).*
European Search Report completed Apr. 27, 2012.

* cited by examiner

TIRE TREAD HAVING SERRATED GROOVES

FIELD OF THE INVENTION

The invention relates generally to a tread for a tire and, more specifically to a directional grooved tread for a tire.

BACKGROUND OF THE INVENTION

The tread of a tire generally wears over time, decreasing the efficacy and functional performance of grooves within the tire tread. Certain tire performance characteristics may be negatively affected thereby.

SUMMARY OF THE INVENTION

According to an aspect of the invention, a tread is provided having groove geometry that emerges as the tread wears down. The tread includes three rows of tread elements, a center row and a pair of shoulder rows, the center row forming a circumferential rib positioned at an equatorial centerplane of the tread. Each shoulder row has a repeating circumferential array of upwardly extending elongate groove fingers, adjacent groove fingers within the repeating array of each shoulder row of groove fingers being connected by at least one laterally extending channel. An array of serrations extend along each longitudinal side of the channels, each serration defined by inward tapering serration sidewalls extending to a serration base surface. The channels are submerged below an outward tread surface such that a submerged channel will emerge as the tread wears down.

In another aspect, each groove finger within the repeating array of each shoulder row of groove fingers has a plurality of channels extending from opposite sides of the groove finger in a staggered formation, each channel extending at an angle of inclination toward the center row of tread elements.

In yet a further aspect of the invention, the arrays of serrations lining the longitudinal sides of the channels are operative to camouflage the tread region surrounding the channel.

BRIEF DESCRIPTION OF THE DRAWINGS

The invention will be described by way of example and with reference to the accompanying drawings in which.

DETAILED DESCRIPTION OF THE INVENTION

Figure 1:
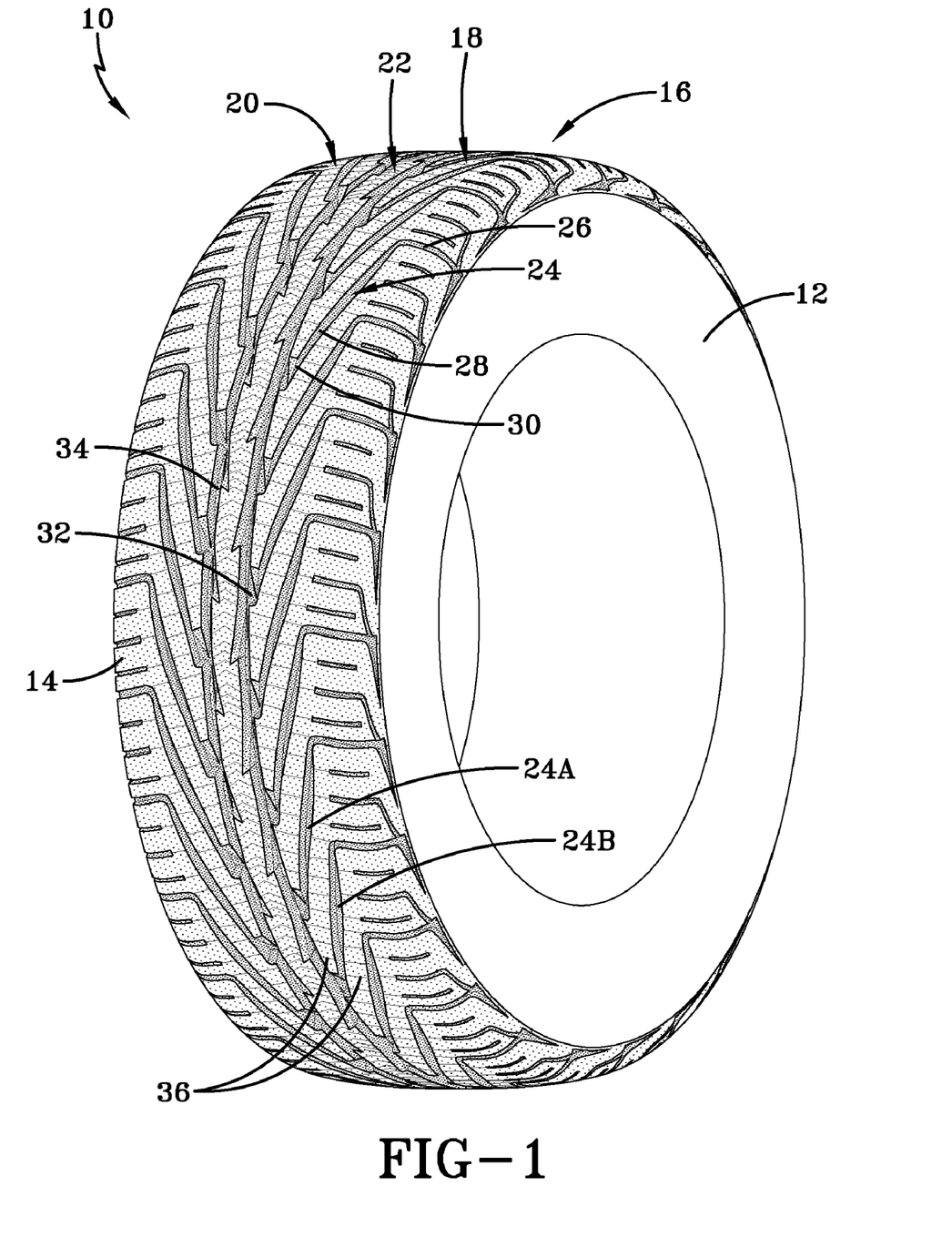
FIG. 1 is an isometric view of a tire without serrations.
Figure 2:
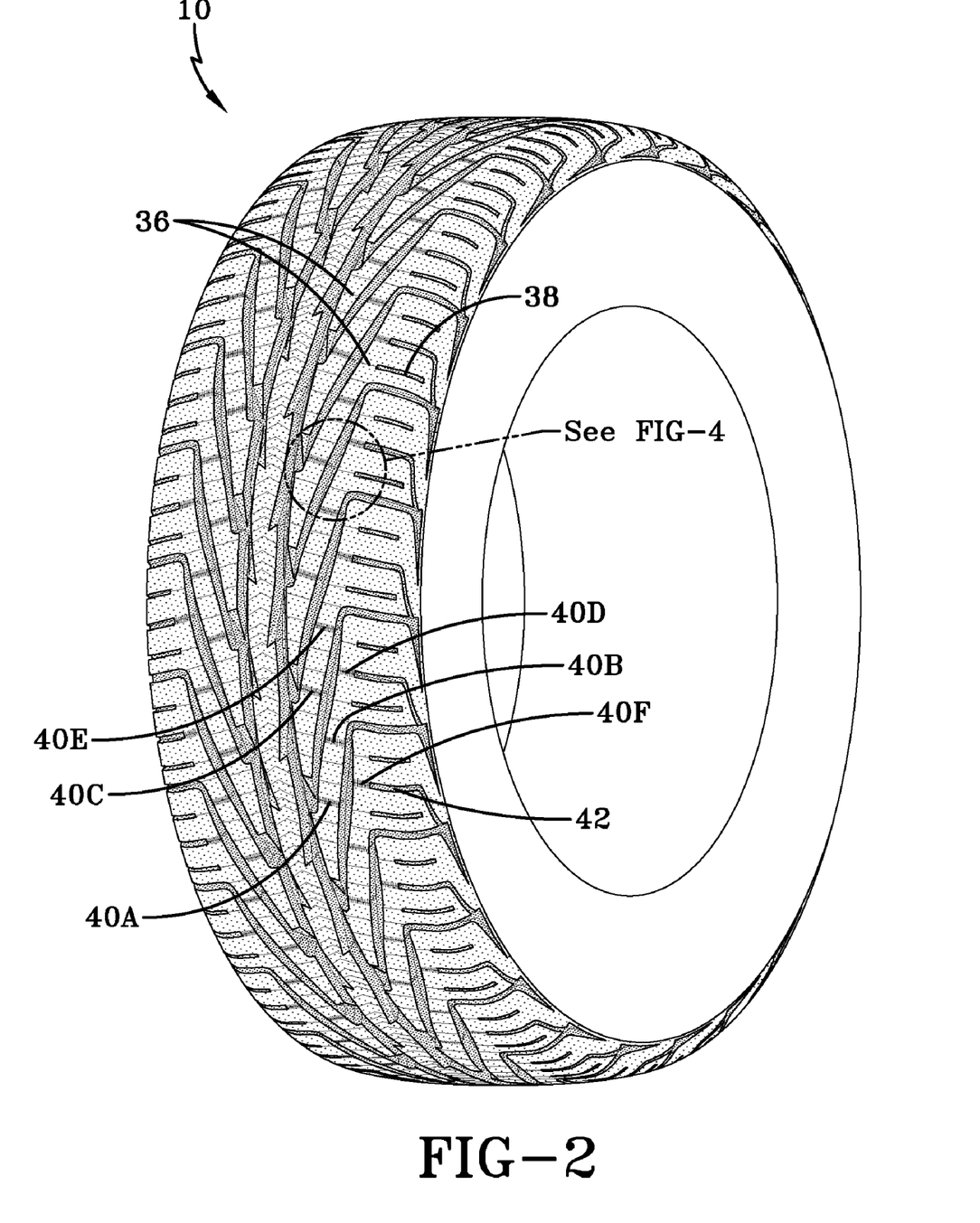
FIG. 2 is an isometric view of a tire with serrations.

Referring to FIGS. 1 and 2, a tire 10 is constructed having sidewalls 12, 14 extending to a crown or tread region 16. The tread 16 has three rows 18, 20, 22 of tread elements; namely a pair of opposite shoulder rows 18, 20 and a central rib 22 extending circumferentially at the equatorial centerplane of the tire. The shoulder rows 18, 20 each have a circumferential repeating array of spaced apart elongate groove fingers 24. Each groove finger 24 has an outward segment 26 originating at an axial edge of the tread 16 and extending axially inward therefrom to intersect a downwardly extending groove finger mid-segment 28. The mid-segment of each groove finger 24 angles downward toward the center rib 22, terminating at a tapered inboard groove finger end 30. The shoulder rows 18, 20 are respectively separated from the center row 22 by a circumferential groove 32, 34. The groove fingers intersect a respective circumferential groove 32, 34 at the inward groove finger end 30. The groove fingers 24 within the sidewall rows 18, 20 are circumferentially staggered on opposite sides of the center rib 22.

Figure 3:
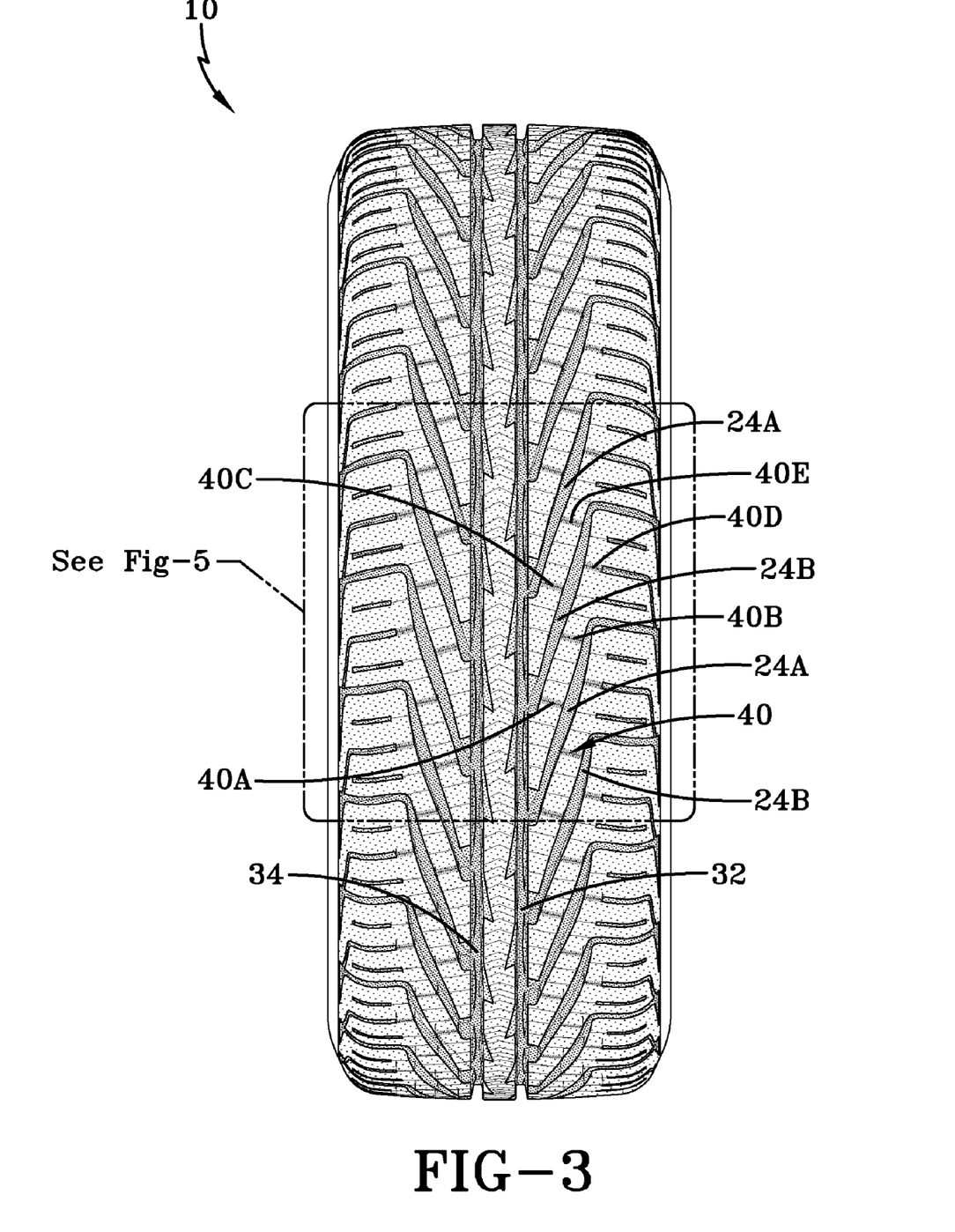
FIG. 3 is a full front view of a tire with serrations.
Figure 4:
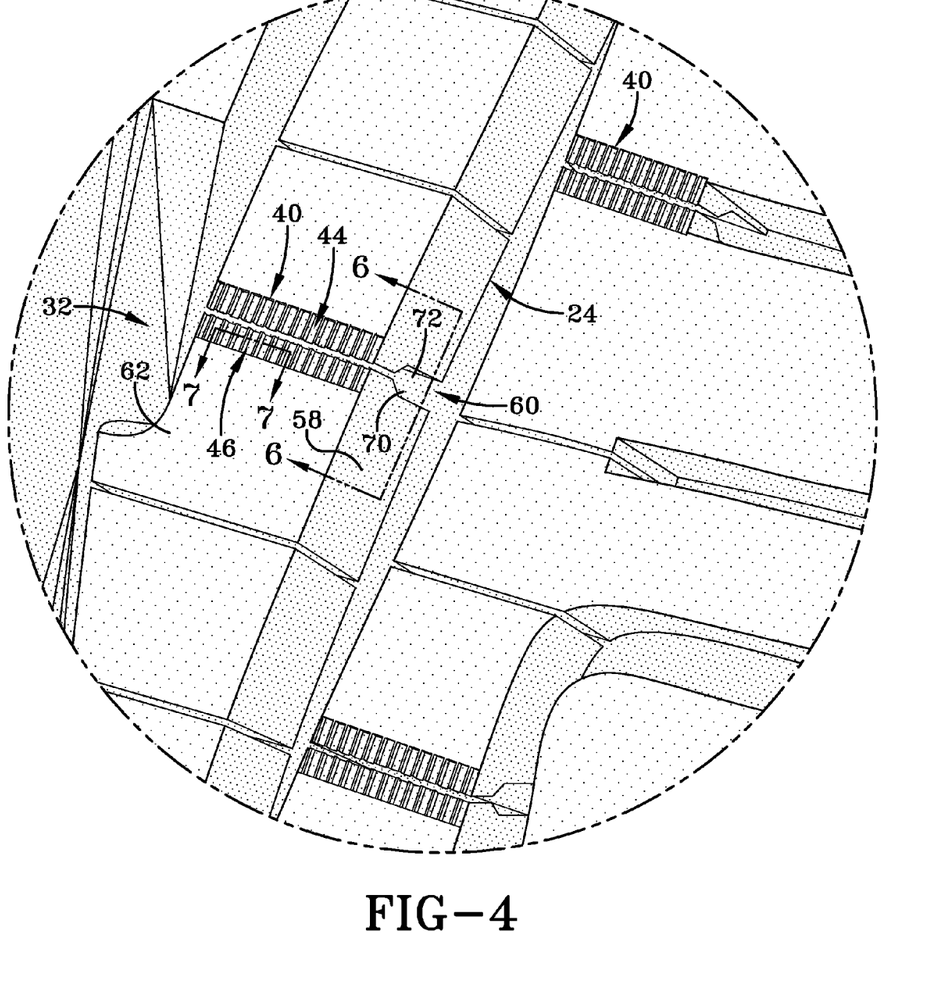
FIG. 4 is an enlarged fragmentary view taken from FIG. 2, showing serration locations over hidden channels.
Figure 5:
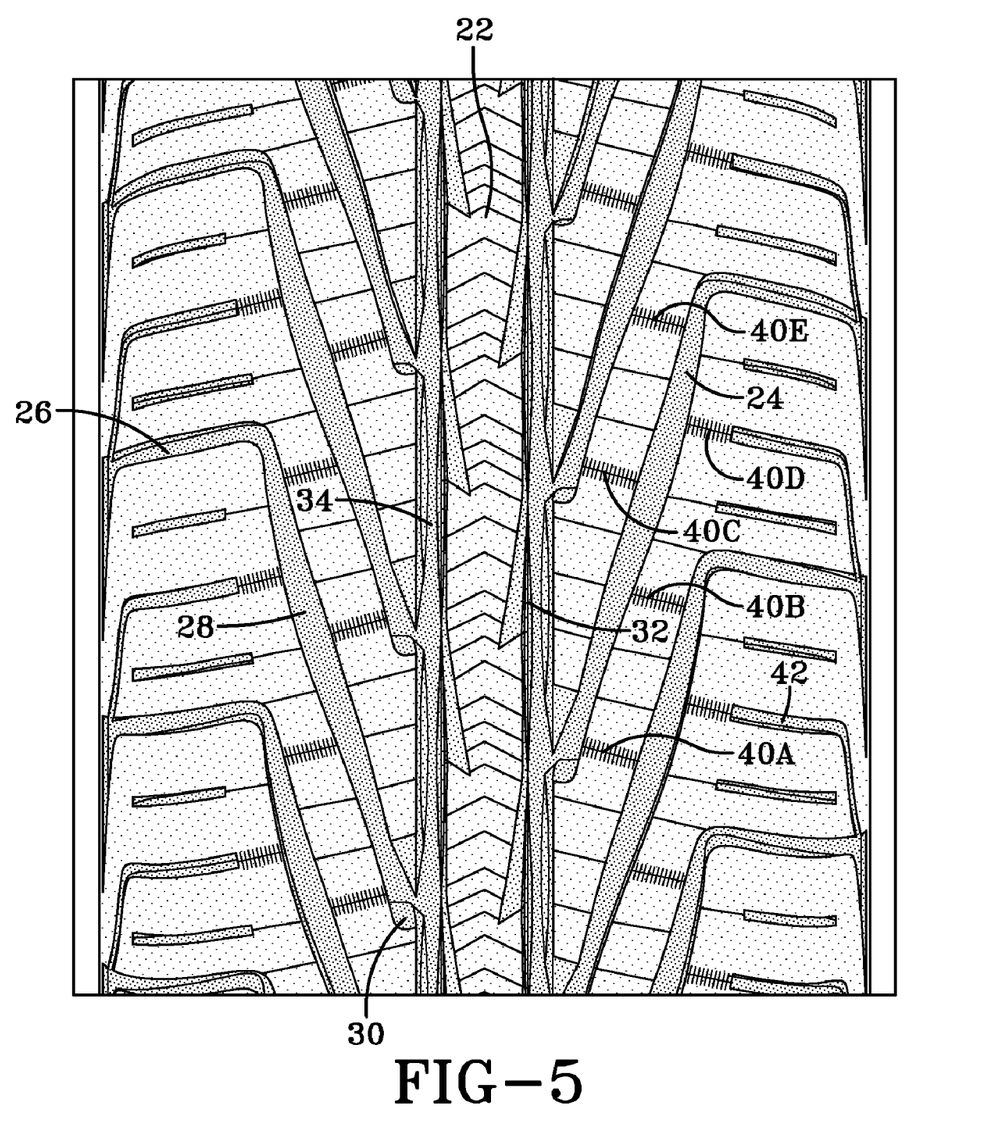
FIG. 5 is an enlarged fragmentary front view taken from FIG. 3.

The tread 16 is formed to provide a circumferential series of spaced apart lateral sipes or channels 36, 40 extending generally axially from a respective circumferential groove 32 or 34 outward toward a tread edge. Lateral sipes 36, 40 are small slots molded into the ribs of the tire that subdivide the tread surface and improve traction characteristics. Sipes 36 are of conventional generally rectangular sectional configuration and extend between adjacent groove fingers within each shoulder row or between a groove finger and a short groove segment 38 at an edge of the tread. The lateral channels or sipes 40 are serrated pursuant to the invention and reside within each tread shoulder row, the serrated channels 40 extending between adjacent finger grooves within each shoulder row or axially outward from an outer groove finger to intersect a shoulder groove element 42. The serrated sipes (also referred herein as "channels") are referred to generally by numeral 40. As will be seen from FIGS. 2 and 3, the circumferential density and placement of the serrated channels 40 may be such that multiple serrated channels 40A through E will extend axially from opposite sides of each groove finger 24 in a staggered configuration as shown. The density and placement of the radially extending serrated channels may be varied to provide by means of siping the traction and tread division functions desired for the particular tread configuration desired.

Each of the serrated channels 40 extend at a slight angle of inclination in an axial direction toward the center rib 22 of the tread. As will be seen from FIGS. 4, 5, 6, and 7, the serrations 40 extend across the centerline of the channel 40 submerged below the surface of the tread. The serrations 40 are approximately 5 mm long on the tread surface, or 2.5 mm on each side of the sipe 40 centerline that the serration intersects. The serrations 40 thus form a serration arrays 44, 46 lining opposite sides of the centerline of a submerged sipe 40. Each serration 40 includes a longitudinal groove 48 defined between inwardly tapering sidewalls 50, 52 extending to a base surface 56 of each serration groove 48. The serration groove 48 extends from a rearward wall 54 inward to an opening or gap 64 on the centerline of the underlying channel 40.

The elongate, downwardly extending mid-segment 28 of each groove finger 24 is defined by a canted sidewall 58 shown in FIGS. 4, 8A, 9A, and 10A. The channels 40 open to a respective groove finger 24 along the canted sidewall 58 of the respective groove finger at a channel opening 60. The channel opening 60 includes an intermediate widening opening portion 70 to a widest base opening portion 72 at the intersection with a respective groove finger 24. Thus, the channels 40 widen as the tread wears radially inward as will be explained and shown in the drawings to a wider width dimension at the base.

Figure 6:
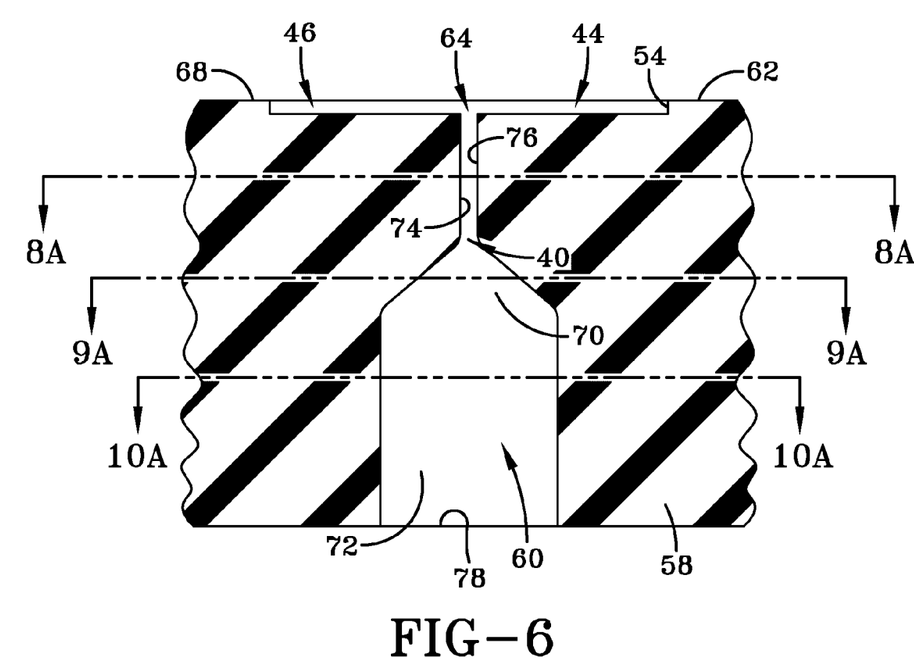
FIG. 6 is a sectioned view showing sides of serrations and a hidden channel, taken from FIG. 4.
Figure 7:
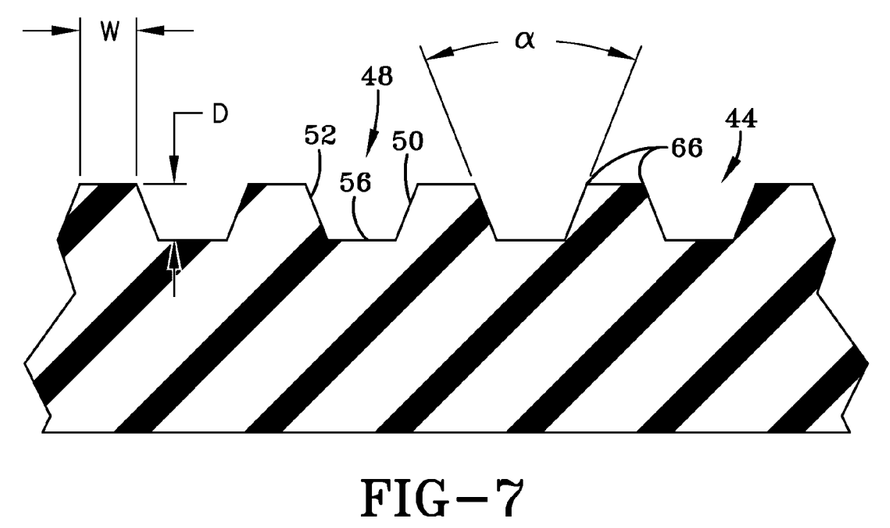
FIG. 7 is a sectioned view of serrations, taken from FIG. 4.

From FIGS. 6 and 7, it will be seen that the serrated arrays 44, 46 run perpendicular to the longitudinal centerline of the channels 40. It will further be seen that the channels 40 widen at 60 toward the base of a canted sidewall 58 defining a groove finger 24. The serration grooves 48 are defined by sidewalls 50, 52 which taper inwardly at an angle α lying within a preferred range of 10 to 60 degrees, preferably at a target of 43 degrees. The spacing W between adjacent serration grooves 48 along the outer tread surface 62 is within a range of 0.3 mm to 0.5 mm, preferably at a target W of 0.4 mm. The depth D of each serration 48 is within a range of 0.3 mm to 0.5 mm with a preferred depth of 0.4 mm. Each of the serrations 48 is approximately 5 mm long, or 2.5 mm on each side of the sipe or channel 40 centerline that the serration intersects.

Figure 8A:
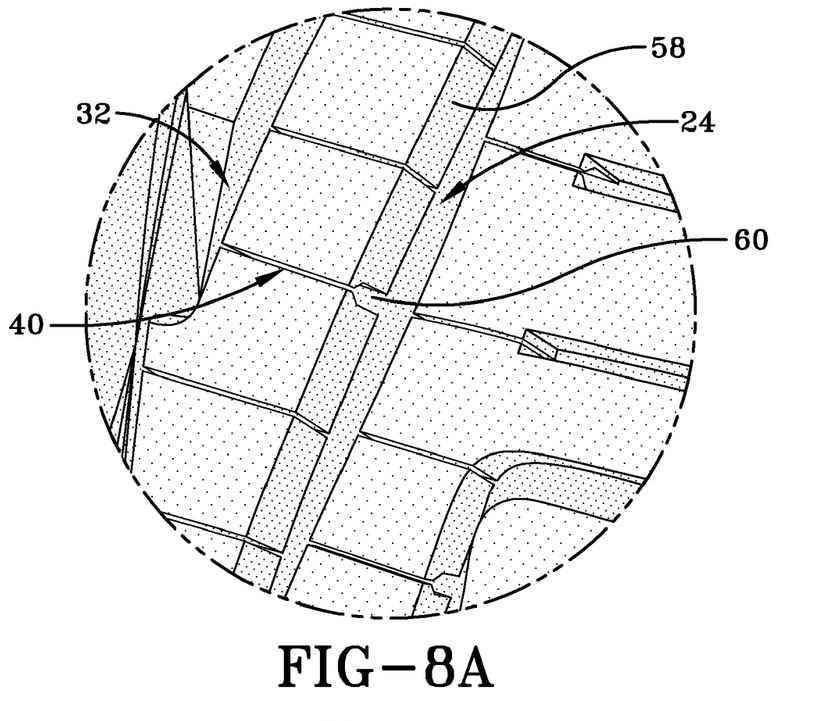
FIG. 8A is an isometric view showing tread wear at a first location taken from FIG. 6.
Figure 8B:
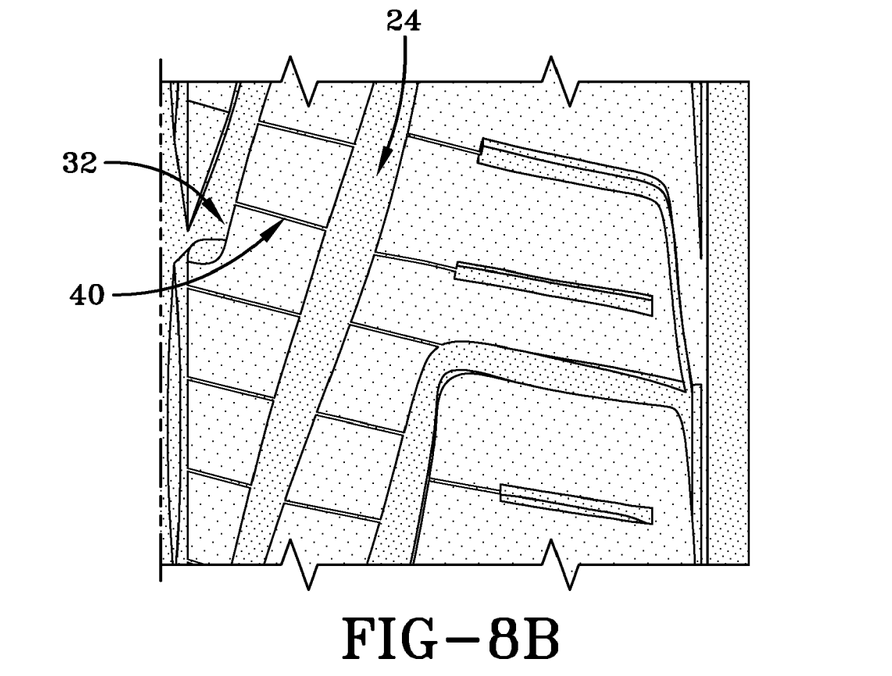
FIG. 8B is a plan view of FIG. 8A.
Figure 9A:
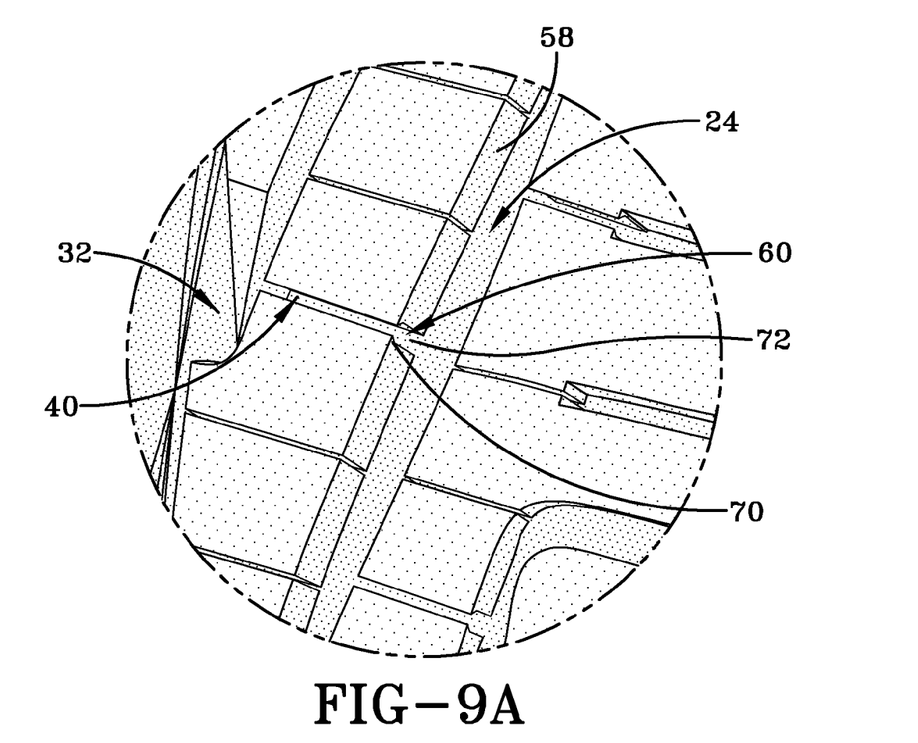
FIG. 9A is an isometric view showing tread wear at a second location taken from FIG. 6.
Figure 9B:
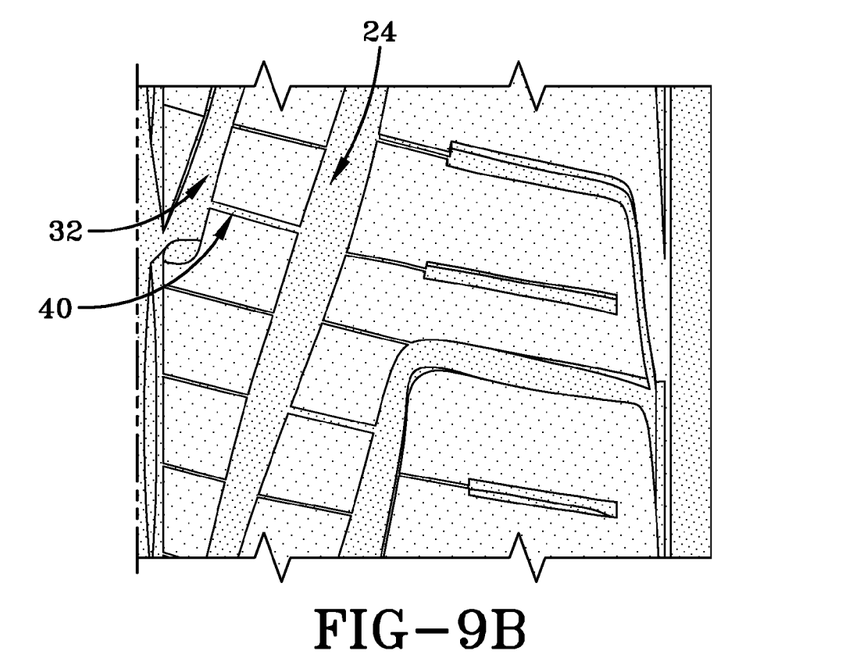
FIG. 9B is a plan view of FIG. 9A.
Figure 10A:
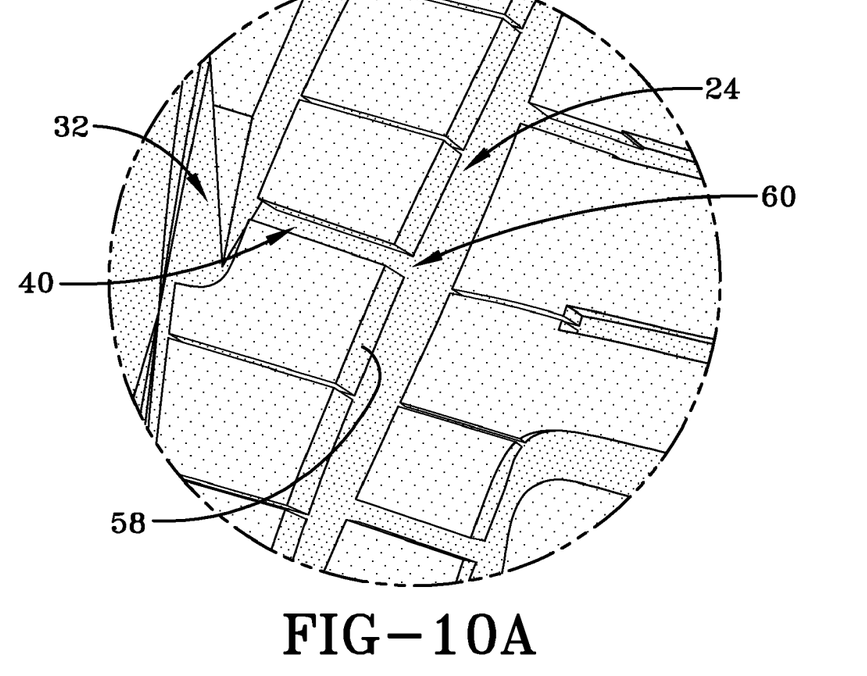
FIG. 10A is an isometric view showing tread wear at a third location taken from FIG. 6.
Figure 10B:
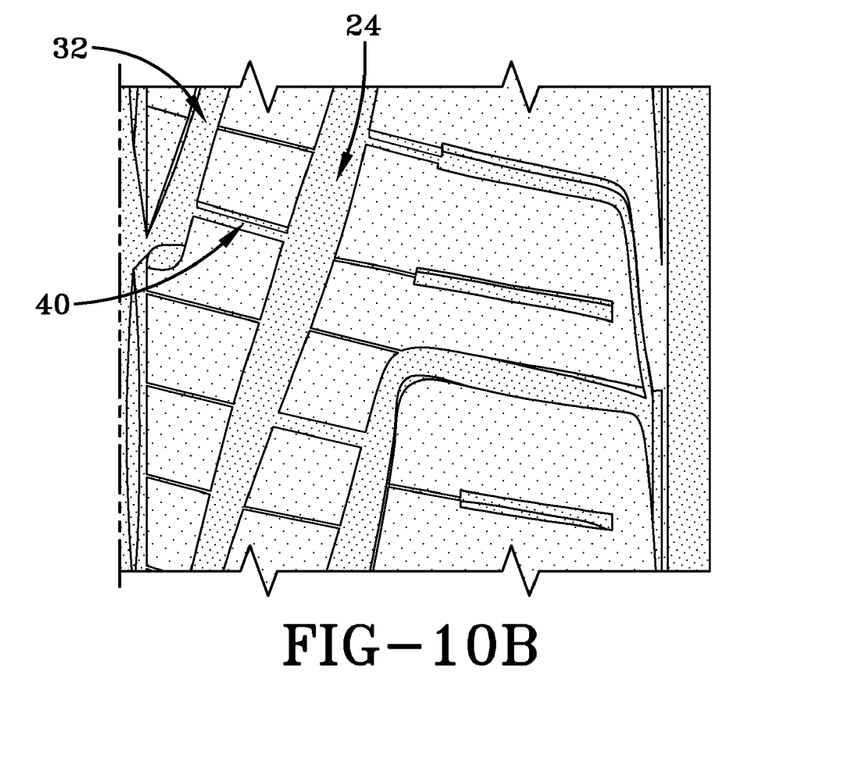
FIG. 10B is a plan view of FIG. 10A.

The serrations 48 are positioned at the tread surface 62 radially outward from the submerged sipes 40 that will only emerge after sufficient tread wear. The sipes 40 are defined between opposite sipe walls 74, 76 (FIG. 6) and extend to a widening lower region 70 and to a widest base region 72 at a base floor 78 of the channel 40. As the tread wears, the serration arrays 44, 46 will wear away until the sipes 40 emerge. FIGS. 8A and 8B as identified in FIG. 6 illustrate a tread configuration that will emerge as the tread wears down to a level 8A. At the tread level shown by FIGS. 8A, 8B, it will be seen that the sipes 40 have emerged and are visible. With continued wear of the tread radially down to the level represented by FIGS. 9A, 9B, the lower, wider sipe portion 70 will emerge. The widening of the sipes 40 from the narrower width of FIGS. 8A, 8B to the wider width shown in FIGS. 9A, 9B and, finally, to a wider yet base width shown by FIGS. 10A, 10B is for the purpose of increasing the groove volume in the later stages of the tire's usable life. The result of the increased groove volume is improved wet performance over a tire without the evolving sipes.

With continued tread wear, at the tread level represented by FIGS. 10A, 10B, the widest lower region 72 of the sipe 40 will emerge. Throughout the tread wear process, the functional purpose and configuration of the sequentially emerging portions of channels 40 is maintained in contrast to conventional tread surface channels that, with wear, are eliminated. The sipes 40 thus survive tread wear and continue to perform the traction and tread sectioning functions desired.

From the foregoing, it will be noted that the serrations 48 highlight the location of the submerged channel 40 that exists below the tread surface 62. The submerged groove will emerge as the tread wears down. The serrations 48 also serve a secondary function in providing an aesthetically pleasing appearance in the area of the submerged channels 40. When the tire is extracted from a mold, the mold element that forms the submerged groove 40 can cause localized discoloration in the area of the groove 40. The serrations 48 and the geometry of the serrations represented by tapering sidewalls 52, as well as the location of the serration arrays 44, 46 along opposite sides of the channels 40, helps to camouflage the discolored areas as well as highlighting the location of the submerged channels 40.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A tread for a tire, comprising:
   at least three rows of tread elements, a center row and a pair of shoulder rows, the center row forming a circumferential rib positioned at an equatorial centerplane of the tread and each of the shoulder rows separated from the center row by a respective circumferentially extending groove;
   each shoulder row having a repeating circumferential array comprising a plurality of elongate groove fingers, extending upwardly with respect to the center row, adjacent groove fingers within the repeating array of each shoulder row of groove fingers being connected by at least one channel extending along a longitudinal axis in substantially an axial tire direction connecting at opposite ends to the adjacent groove fingers; and
   each of the channels being submerged from a radially outward tread surface and having a longitudinal centerline plane, each said submerged channel defined a pair of spaced apart channel sidewalls extending to a channel base surface; and the tread having first and second arrays of serrations lining a respective longitudinal side of a respective submerged channel, each serration extending into tread surface from a rearward serration closed end wall to the longitudinal centerline plane of the respective submerged channel defined by inward tapering serration sidewalls extending to a serration base surface, and each serration extending inward to intersect the centerline plane of the channel at an intersection angle substantially equal to ninety degrees.

2. The tread of claim 1, wherein at least a plurality of the serrations within each array each has a depth D from the radially outward tread surface to the serration bottom surface within a range of 0.3 to 0.5 mm.

3. The tread of claim 1, wherein at least a plurality of adjacent serrations within each array are spaced apart a distance W within a range of 0.3 to 0.5 mm.

4. The tread of claim 1, wherein at least a plurality of serrations within each array each has a width dimension at the radially outward tread surface within a range of 0.65 to 0.8 mm and a width at the serration base surface within a range of 0.3 to 0.5 mm.

5. The tread of claim 1, wherein the tapered sidewalls of at least a plurality of serrations form an angle α between the sidewalls within a range of 10 to 60 degrees.

6. The tread of claim 1, wherein each channel is submerged from the outer tread surface radially inward of the base surface of the serrations along opposite sides of the channel centerline plane.

7. The tread of claim 6, wherein the arrays of serrations along opposite sides of a respective channel are operative to delay the emergence of the channel as the tread wears down.

8. The tread of claim 7, wherein at least a plurality of the serrations each has a depth D from the radially outward tread surface to the serration bottom surface within a range of 0.3 to 0.5 mm.

9. The tread of claim 8, wherein at least a plurality of adjacent serrations within the array are spaced apart a distance W within a range of 0.3 to 0.5 mm.

10. The tread of claim 9, wherein the tapered sidewalls of at least a plurality of serrations form an angle α between the sidewalls within a range of 10 to 60 degrees.

11. The tread of claim 10, wherein each groove finger within the repeating array of each shoulder row of groove fingers having a plurality of channels extending from opposite sides of the groove finger in a staggered formation, each channel extending at an angle of inclination toward the center row of tread elements.

12. The tread of claim 1, wherein arrays of serrations line opposite longitudinal sides of a respective channel, the arrays of serrations operative to visibly camouflage a tread region surrounding the respective channel.

* * * * *